United States Patent
Helot (10) Patent No.: US 6,169,655 B1
(45) Date of Patent: Jan. 2, 2001

(54) COMPUTER DOCKING DRAWER

(75) Inventor: Jacques H. Helot, San Mateo, CA (US)

(73) Assignee: Hewlett-Packard Company, Palo Alto, CA (US)

(*) Notice: Under 35 U.S.C. 154(b), the term of this patent shall be extended for 0 days.

(21) Appl. No.: 09/071,133

(22) Filed: Apr. 30, 1998

(51) Int. Cl.[7] .............................. H05K 5/00; H05K 7/00
(52) U.S. Cl. ................. 361/686; 361/683; 361/724; 312/223.2
(58) Field of Search ............................ 312/223.3, 194, 312/195, 260, 261; 361/686, 683, 724

(56) References Cited

U.S. PATENT DOCUMENTS

| | | | |
|---|---|---|---|
| 4,766,422 | * 8/1988 | Wolters et al. | 312/194 |
| 5,526,493 | * 6/1996 | Shu | 395/281 |
| 5,561,589 | * 10/1996 | Mesfin et al. | 361/686 |
| 5,651,594 | * 7/1997 | Lechman | 312/194 |
| 5,801,921 | * 9/1998 | Miller | 361/686 |
| 6,022,087 | * 2/2000 | Gilbert | 312/194 |
| 6,029,215 | * 2/2000 | Watts, Jr. et al. | 710/101 |

* cited by examiner

*Primary Examiner*—Leo P. Picard
*Assistant Examiner*—Tung Minh Bui (57) ABSTRACT

A portable computer is docked within a drawer concealing the computer from view and minimizing use of scarce desktop space. The drawer includes a docking platform with a docking connector. The computer is positioned on the platform at a desired alignment position. The computer includes a docking connector for mating to the drawer's docking connector. The action of closing the drawer causes the computer docking connector and drawer docking connector to mate. The drawer docking connector is electrically coupled to an expansion unit which has ports or other interfaces for coupling to a display, full-size keyboard, network resources and peripheral devices, such as a printer, CD-ROM, and floppy disk drive.

20 Claims, 6 Drawing Sheets

COMPUTER DOCKING DRAWER

BACKGROUND OF THE INVENTION

This invention relates generally to portable computer docking methods and apparatus.

Portable "personal" computers have developed from the early cumbersome suitcase design to smaller laptop designs to the now commercially-predominant notebook, subnotebook and palm top computers. The evolution has been toward smaller, lighter computers with increasing transportability and usability. The state of the art continues to improve by (i) increasing battery life, (ii) decreasing circuitry and system weight, (iii) adapting compartments for add-in cards, and (iv) decreasing housing size.

The typical portable computer includes a display screen housing hinged to a keyboard housing. The display screen housing folds down against the keyboard where the two housings latch together. A disk drive often is mounted in the keyboard housing. Additional features include a docking connector, input/output ports and one or more compartments for receiving PCMCIA cards, (peripheral devices conforming to the Personal Computer Memory Card International Association (PCMCIA) standards for personal computer-based peripherals).

Even though the processing throughput, memory and other performance features of a notebook computer are achieving similar levels to desktop computers, there still are trade-offs for using a notebook computer. Typically, the keyboard and display are smaller than are used for desktop computers. Larger displays and keyboards are desired for usability and ergonomic reasons. As a result, it is common to have a docking station in a desktop environment. A full-size keyboard, a desk top display monitor, additional memory storage devices, network resources, and peripherals, typically are accessible through the docking station.

It is desirable that the connection and disconnection between the notebook computer and the docking station be easy, convenient and reliable.

It also is desirable that the computer and docking station take up little desk space.

Portable computers often are used in an office environment with a docking station. One concern with such usage is the ease with which a portable computer can be removed and stolen. Accordingly, there is a desire for including security precautions in a docked notebook computing environment.

SUMMARY OF THE INVENTION

According to the invention, a portable computer is docked within a drawer concealing the computer from view and minimizing use of scarce desktop space.

According to one aspect of the invention, the drawer includes a docking platform with a docking connector. The computer is positioned on the platform at a desired position. The computer includes a docking connector for mating to the drawer's docking connector.

According to another aspect of the invention, the action of closing the drawer causes the computer docking connector and drawer docking connector to mate. The drawer docking connector is electrically coupled to an expansion unit which has ports or other interfaces for coupling to a display, full-size keyboard, network resources and peripheral devices, such as a printer, CD-ROM, and floppy disk drive.

According to another aspect of this invention, a docking apparatus for a portable computer includes a furnishing having a desktop surface and an opening. A drawer moves within the opening between an open position and a closed position. The computer is inserted into the drawer. A docking connector, which serves as an electrical interface with the portable computer, is located within opening, either attached to the drawer or to the furnishing.

According to another aspect of the invention, a platform is located within the drawer. The portable computer rests on the platform while in the drawer. For a computer with an underside docking connector, the platform includes the docking connector which interfaces to the computer.

According to another aspect of the invention, a ramp is rotatably coupled to the platform, the ramp has an elevated position and a depressed position. A guide structure is fixed to the ramp. A corresponding guide structure is fixed to the furnishing within the opening. The two guide structures are operative to mechanically link the position of the ramp to the open or closed position of the drawer.

An advantage of the invention is that the docking process is easy, convenient and reliable. The operator inserts the computer into the drawer to a desired alignment position, then closes the drawer. Such docking has the ease and reliability of an automated process, but is achieved at substantially less cost. Another advantage is that the computer is unexposed, providing a deterrent to theft. A further deterrent is that the drawer can be locked preventing physical access to the computer. Another advantage of this invention is that additional desktop space is free by having the notebook computer and docking connector be located off the desktop in a drawer. These and other aspects and advantages of the invention will be better understood by reference to the following detailed description taken in conjunction with the accompanying drawings.

DESCRIPTION OF SPECIFIC EMBODIMENTS

Overview

Figure 1:
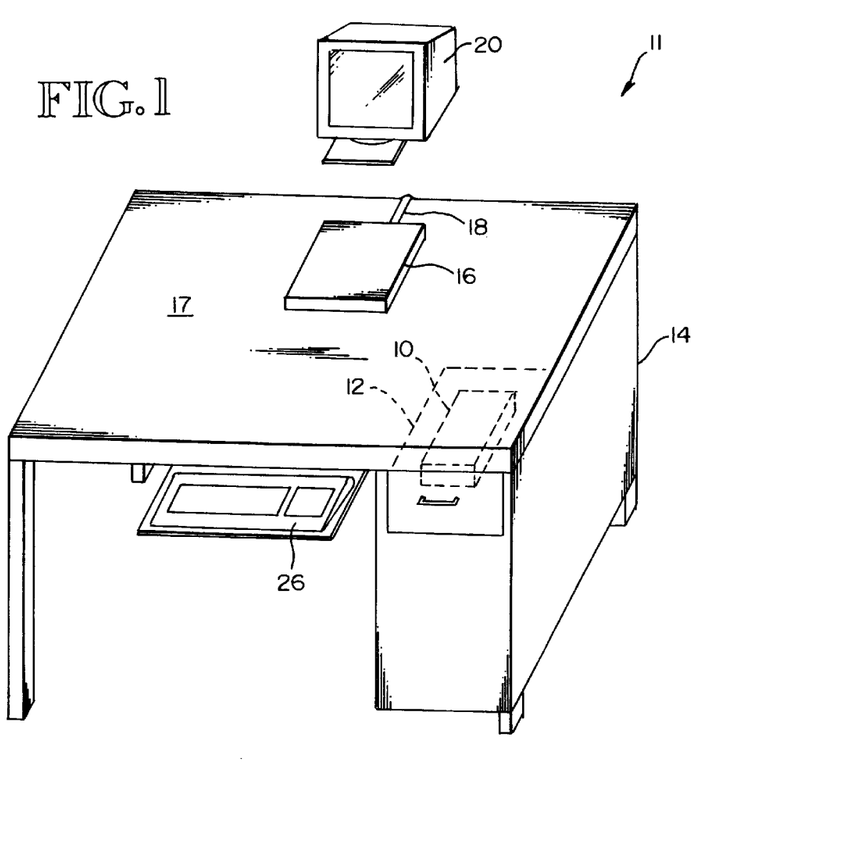
FIG. 1 is a perspective view of a desktop work environment with a notebook computer docked in a drawer according to an embodiment of this invention.

FIG. 1 shows a desktop computer environment 11 with a notebook computer 10 docked within a docking drawer 12 according to an embodiment of this invention. The drawer 12 is part of a desk 14, cabinet or other housing structure. While docked within the drawer 12, the notebook computer 10 is electrically connected to an expansion module 16 via a cable 18, wire, fiberoptic or other electrical connection. The expansion module is situated on the desktop 17 and generally has a small footprint. In one embodiment the expansion module 16 is thin having a small height (e.g., 2 inches). A display monitor 20 for example, is connected to the expansion module 16 and may be situated on the expansion module housing. Thus, the display monitor is elevated only approximately 2 inches above the height it would be when situated directly on the desktop. As a result no extra desktop space is needed for the computer and expansion module beyond the display space. In another embodiment the expansion module looks like a tower having a small footprint. The expansion module may be located on the desktop, the floor or a nearby cabinet or table.

Figure 2:
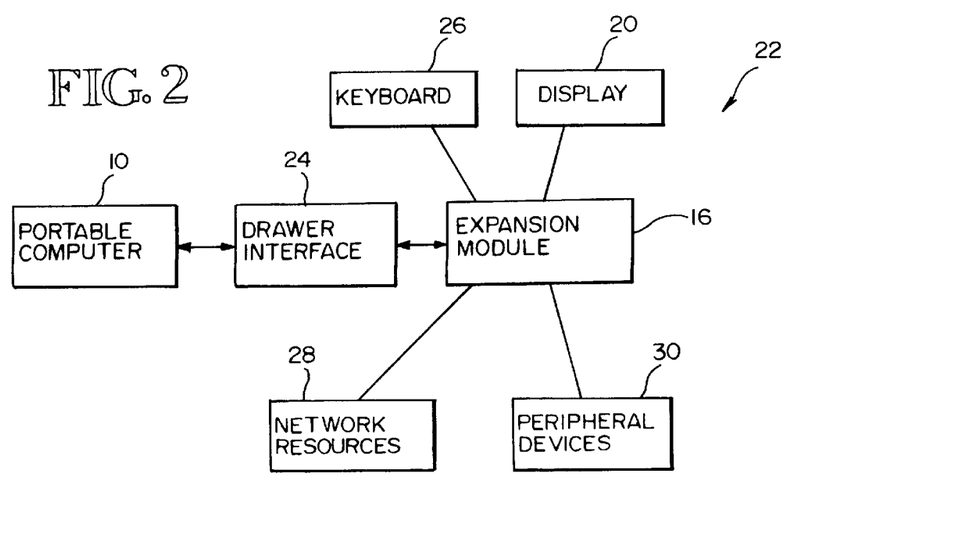
FIG. 2 is a block diagram of the computing environment of the notebook computer of FIG. 1.

FIG. 2 shows an exemplary computing environment 22 for the docked notebook computer 10. The computer 10 is electrically coupled to the expansion module 16 through a drawer interface 24. The expansion module 16 like a conventional docking station includes ports or other interfaces for coupling to the display 20, a full size external keyboard 26, network resources 28 and peripheral devices 30 (e.g., printer, CD-ROM, floppy disk drive). The term peripheral device as used herein also encompasses the display, keyboard and network resources.

Figure 3:
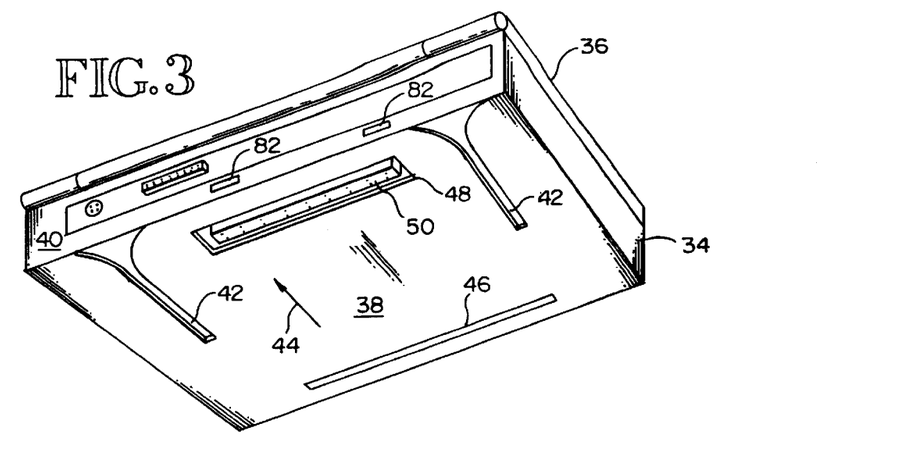
FIG. 3 is a perspective view showing an undersurface and rear edge of a notebook computer having a vertical docking connector.

Referring to FIG. 3 the notebook computer 10 includes a lower housing compartment 34 and an upper housing compartment 36. As one or ordinary skill in the art would appreciate, the lower housing compartment 34 may include an embedded keyboard, a main computer board, and one or more compartments for receiving peripheral devices. Many portable computers 10 also include a floppy disk drive, hard disk drive, CD-ROM and battery pack in the lower compartment 34. Other common internal or plug-in peripherals include fax devices and modems devices. The upper housing compartment 36 typically includes a display screen and related display driver circuitry.

The undersurface 38 and rear edge 40 of the notebook computer 10 are shown in FIG. 3. "Undersurface" as used herein refers to the portion of the lower compartment 34 upon which the computer 10 rests during docking and normal operation. "Rear edge" refers to the portion of the lower compartment 34 facing away from an operator during normal operation of the notebook computer (e.g., operator faces display of open upper compartment 36 with access to an internal keyboard.) One or more parallel tracks 42 are located at the computer undersurface 38. These tracks 42 extend in a direction 44. In the embodiment illustrated there are two tracks 42 formed as indentations. In an alternative embodiment the tracks 42 are protruding rails. The tracks 42 are flared at the distal portion providing a wider lead-in that allows the computer 10 to slide into a desired lateral alignment position during docking. In such lateral alignment the tracks 42 mate with corresponding members 80 of a platform 32 within the drawer 12 (see FIG. 4).

Also located at the undersurface 38 is an alignment member 46 and a docking connector opening 48. A docking connector 50 is accessible through the connector opening 48. The alignment member 46 is for mating to a corresponding alignment member 52 of the docking platform 12 (see FIG. 3). In the embodiment illustrated the alignment member 46 is formed as an opening in the computer undersurface 38 while the alignment member 52 is formed as a protruding rail at the docking platform 32. It is preferable that the alignment members 46, 52 have a mating relation. In alternative embodiments the mating structures may vary. For example, the member 46 may be a protrusion instead of an indentation or opening, while the member 52 may be an indentation or opening instead of a protrusion. In addition the members 46, 52 need not be single elongated members, but may be multiple elongated members, or may be one or more corresponding posts, ridges or other protrusions and one or more openings, notches or other indentations.

Figure 4:
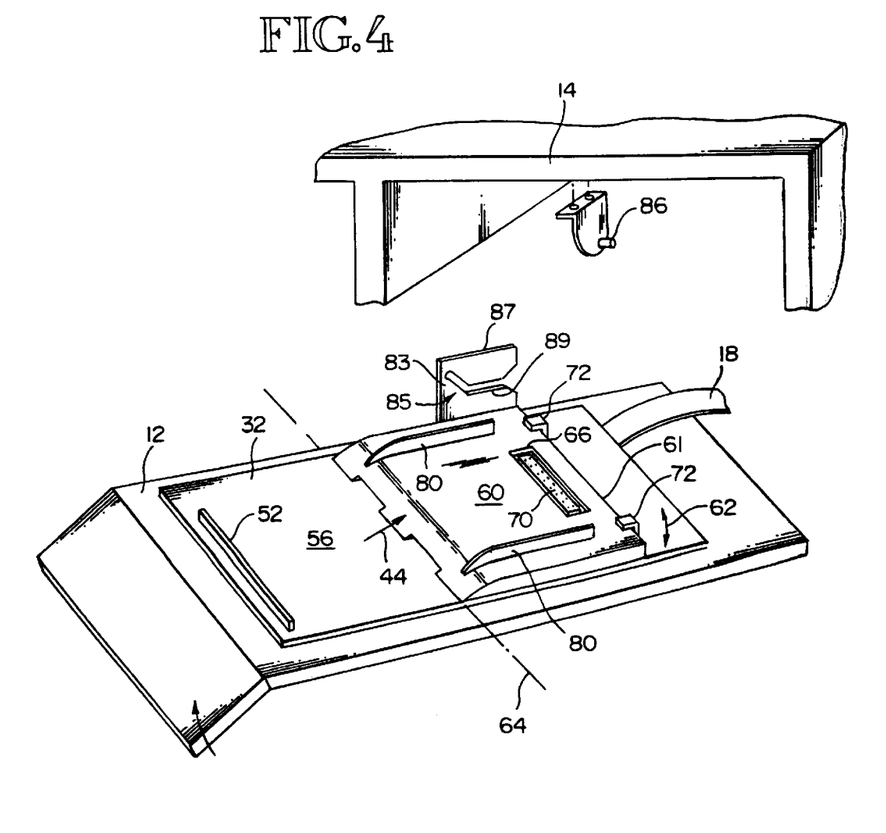
FIG. 4 is an exploded view of a docking platform and drawer according to an embodiment of this invention.

Referring to FIG. 4 the docking platform 32 includes a base 56 and a ramp 60. The ramp 60 is rotatably coupled to the platform 56. A distal portion 61 of the ramp 60 is movable up and down (depicted by bidirectional arrow 62) relative to the base 56 about an axis 64. The ramp 60 includes an opening 66 for exposing the platform's docking connector 70. The docking connector 70 is a mechanical connector having electrical contacts for forming and maintaining an electrical interface with the notebook computer 10. The docking connector 70 is fixed relative to the base 56. As the ramp distal portion 61 rotates downward toward the base 56, the docking connector 70 protrudes through the opening 66. A cable 18, wire or other signal carrying medium is electrically connected to the docking connector 70. Such cable 18 also is connected to the expansion module 16. The docking connector 70 and cable 18 are one embodiment of the drawer interface 24 of FIG. 2.

The ramp 60 also includes guide rails 80 and hooking members 72. The computer 10 is inserted in the drawer 12 and moved along the rails 80 with the rails 80 mating to the computer undersurface's tracks 42. The hooking members 72 are located at the distal portion 61 of the ramp. The hooking members 72 mate with the computer 10 during docking and secure the computer 10 to the platform 32. In particular the hooking members 72 ensure that the portable computer and platform 32 docking connectors 50, 70 are aligned before docking is attempted. This prevents connector damage. Such hooking mechanisms 72 also serve to prevent an operator from removing the notebook computer while docked. To release the hooking mechanisms 72 an appropriate undocking sequence is to be followed. The hooking members grasp the computer 10 at openings 82 along the computer's rear edge 40.

In a preferred embodiment a wall 83 having a guide slot 85 is fixedly attached to the ramp 60. A post 86 runs along the slot 83 while the drawer 12 is being opened or closed. The slot 85 includes an angled portion 87 and a straight portion 89. Such angled and straight portions are relative to the plane of the ramp 60. As the post 86 runs along the angled portion 87 of the slot toward the straight portion 89, the ramp is forced to rotate down toward the base 56. As the post 86 runs along the angled portion 87 of the slot away from the straight portion 89, the ramp is forced to rotate up away from the base 56. The post 86 is mounted to the desk 14 or another structure which is fixed and independent of the motion of the drawer 12.

Docking Method

Figure 5:
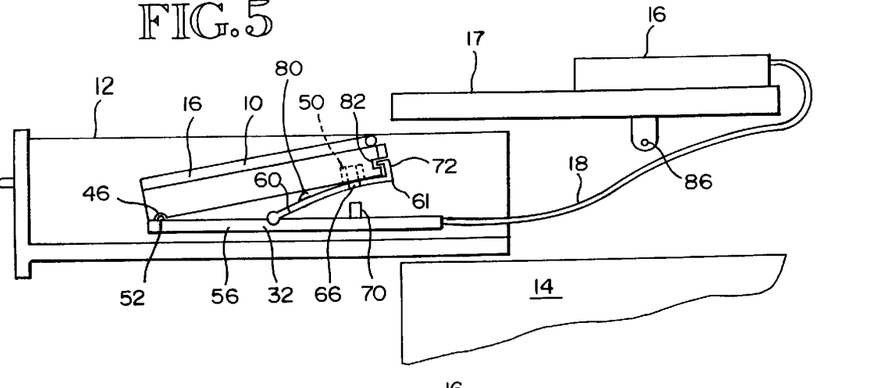
FIGS. 5 is a diagram of the notebook computer inserted within the drawer while in an undocked position.
Figure 6:
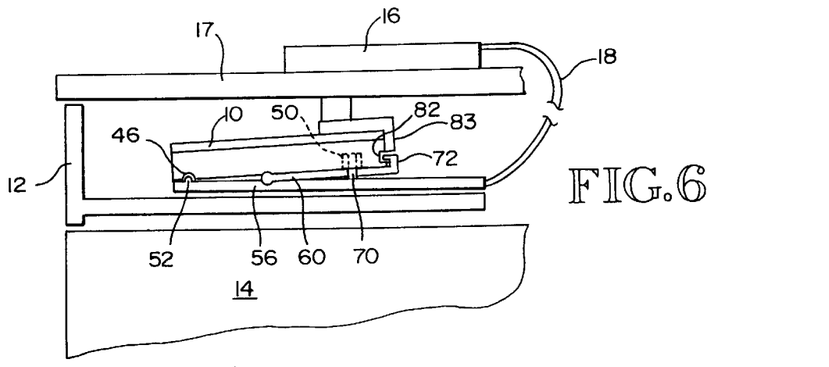
FIG. 6 is a diagram of the notebook computer inserted within the drawer with the drawer closed and the computer in the docked position.
Figure 7:
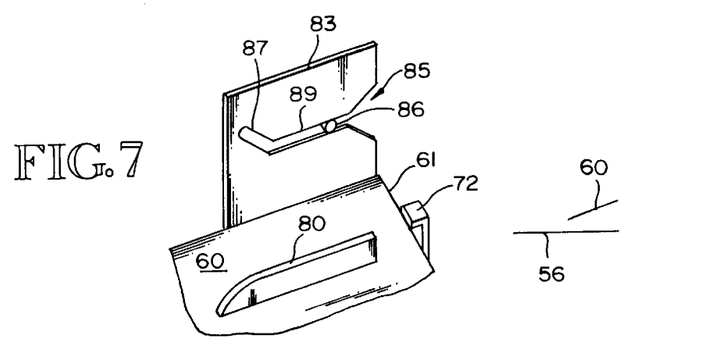
FIG. 7 is a partial view of the platform track and desk post for the drawer in the open position.
Figure 8:
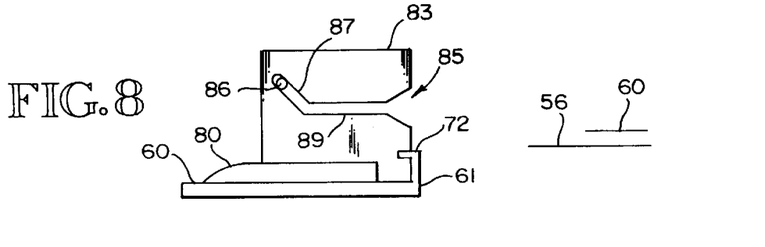
FIG. 8 is a partial view of the platform track and desk post for the drawer in an intermediate position where the platform ramp is moved down into the docking position by the action between the post and the track.

To perform docking of the computer 10 to the platform 32, the computer 10 is inserted in the drawer 12. The computer undersurface 38 is placed in contact with the platform base 56 and slid in direction 44 along the base 56 and up the ramp 60. In a preferred embodiment the computer 10 is slid manually by an operator. As the computer 10 is moved, the ramp rails 80 mate into the tracks 42 at the computer undersurface 38. In some embodiment the tracks 42 have a wide opening toward the computer rear edge 40 to facilitate mating and lateral alignment. As the computer 10 is slid up the ramp 60, the rails 80 and tracks 42 come into alignment. Eventually, the computer 10 slides into a prescribed alignment position as shown in FIG. 5. In the alignment position the hooking members 72 at the ramp distal portion 61 mate into corresponding openings 82 (see FIGS. 3 and 5) at the computer rear edge 40. In addition, while in the prescribed alignment position, the respective alignment members 46 and 52 of the computer 10 and platform 32 line up and mate (see FIG. 5). The computer docking connector 50 is exposed to the platform 32 through the opening 48. Similarly, the platform docking connector 70 is exposed to the computer 10 through the opening 66.

With the computer 10 slid into the prescribed alignment position, the next step is to close the drawer 12. As the drawer closes, the post 86 is guided into the slot 85 of the guide member 83. The post 86 is fixed to the desk 14 and does not move when the drawer 12 closes. The guide member 83 is fixed to the ramp 60 and moves with the platform 32 and drawer 12 as the drawer closes. The post 86 therefore moves relative to the guide member 83. The post 86 enters the slot 85 at a first flared end and enters into the straight portion 89 of the slot 85. Eventually, an operator closes the drawer 12 enough for the post 86 to move into the angled portion 87 of the slot 85. Such relative motion forces the guide member 83 to move downward within the drawer. As the guide member 83 is fixed to the ramp 60, the ramp is forced down. The computer situated on the ramp and secured by the hooking members 72 moves down with the ramp. Such downward action brings the docking connectors 50 and 70 together to mate. Thus, the action of closing the drawer mates the docking connectors 50 and 70. With the connectors mated, the computer 10 is docked to the platform 32 and expansion module 16.

To undock the computer 10 the drawer 12 is opened. As the drawer opens the post 86 runs from the angles portion 87 of the slot 85 toward the straight portion 89. Such relative motion forces the guide member 83 to move upward within the drawer 12. As the guide member 83 is fixed to the ramp 60, the ramp is forced upward also. The computer 10 situated on the ramp 60 and secured by the hooking members 72 moves up with the ramp 60. Such upward action separates the docking connectors 50 and 70. Thus, the action of opening the drawer 12 disconnects the docking connectors 50 and 70 and undocks the computer 10 from the platform 32. As the drawer 12 continues to open the post 86 moves into the straight portion 89 of the slot 85, then exits the slot 85 and guide member 83.

While docked, the computer 10 is situated in the closed drawer 12. Thus, the computer cannot be inadvertently disconnected from the platform 32. Further, the hooking mechanisms 72 prevent vertical movement of the computer 10 relative to the platform 32. The docking connector 50, 70 prevent movement within a horizontal plane of the platform 32. For further security and theft prevention or theft deterrence the drawer 12 may be locked.

Alternative Embodiment

Figure 9:
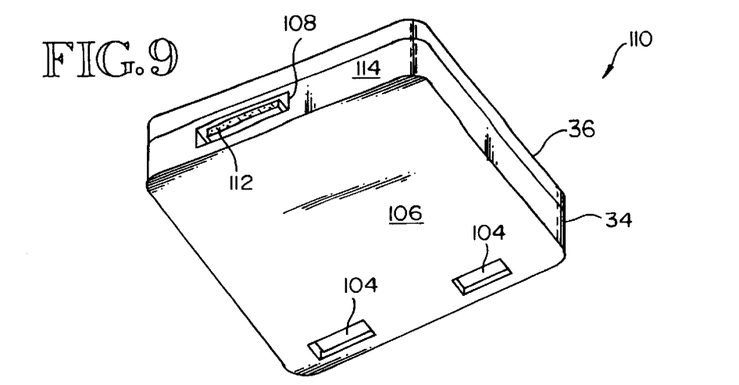
FIG. 9 is a perspective view showing an undersurface and rear edge of a notebook computer have a rear edge docking connector.

FIG. 9 shows a notebook computer 110 having a rear edge docking connector 112. Like the computer 10 of FIG. 3, the notebook computer 110 includes a lower housing compartment 34 and an upper housing compartment 36. As one or ordinary skill in the art would appreciate, the lower housing compartment 34 may include an embedded keyboard, a main computer board, and one or more compartments for receiving peripheral devices. The portable computers 110 also may include a floppy disk drive, hard disk drive, CAROM and battery pack in the lower compartment 34. Other common internal or plug-in peripherals include fax devices and modems devices. The upper housing compartment 36 typically includes a display screen and related display driver circuitry. When docked the computer 110 is located in a desktop working environment resembling the environment 11 of FIG. 1 and in a computing environment resembling the computer environment 22 of FIG. 2.

Alignment structures 104 for aligning the computer to docking structures in a drawer are located along the undersurface 106 of the computer 110. An opening 108 occurs along the rear edge 114. The docking connector 112 is accessible through the opening 108.

Figure 10:
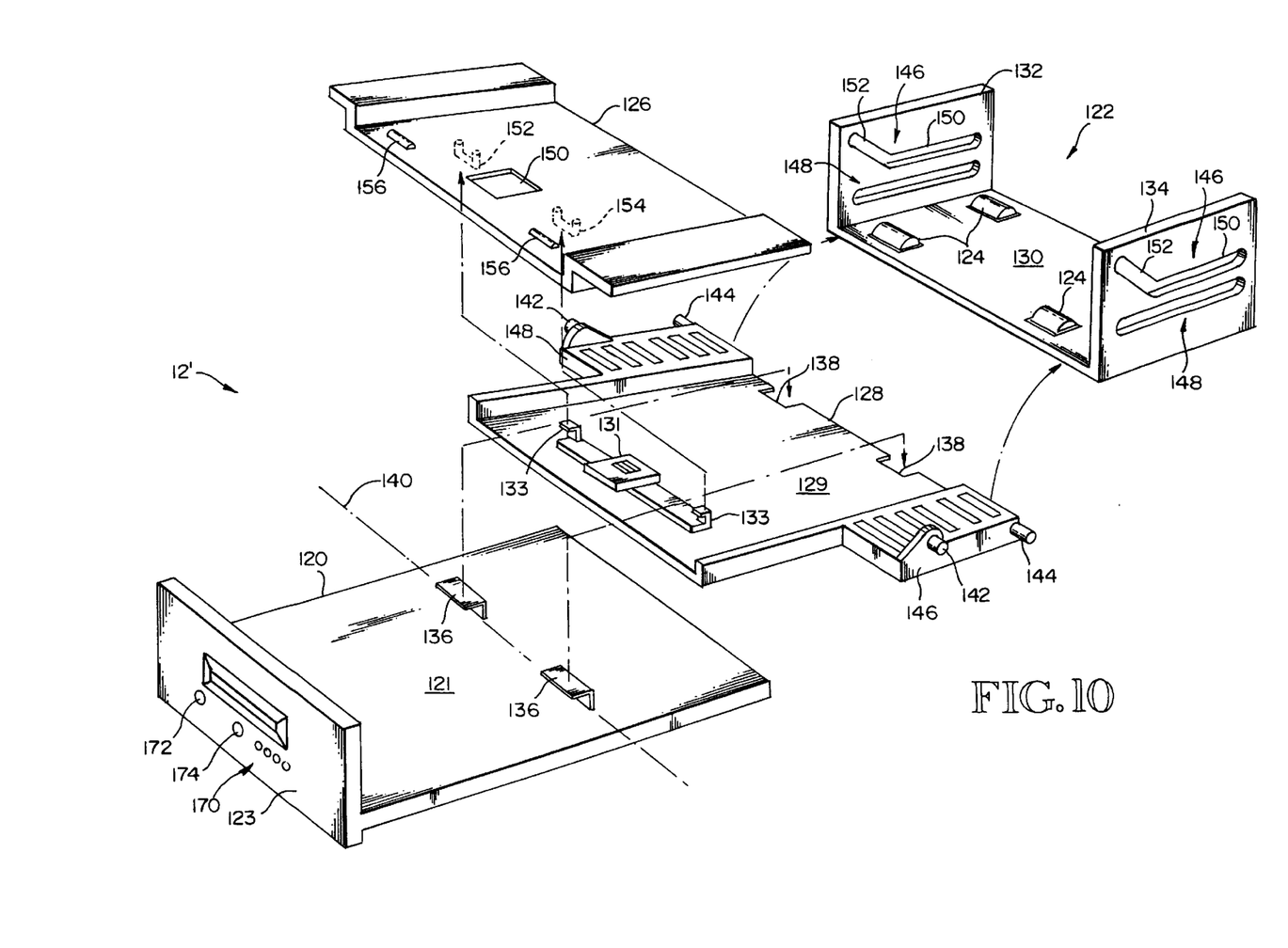
FIG. 10 is an exploded view of a docking drawer according to an alternative embodiment of this invention.
Figure 11:
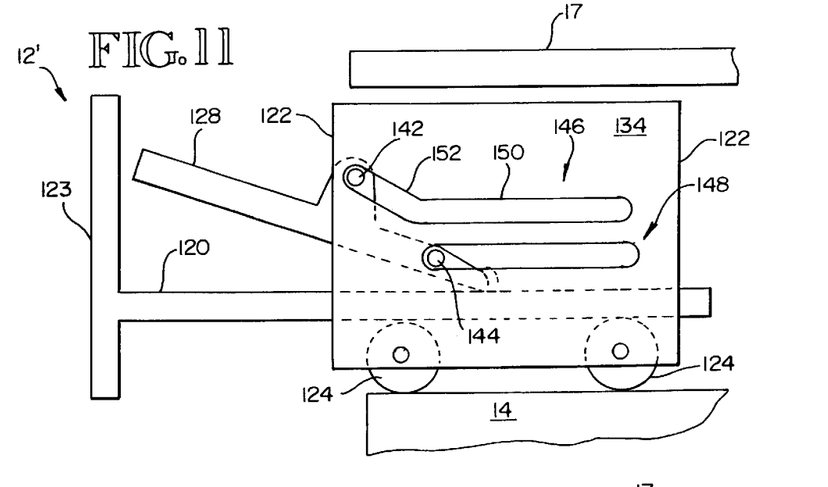
FIG. 11 is a side view of the drawer of FIG. 10 in a fully open position.
Figure 12:
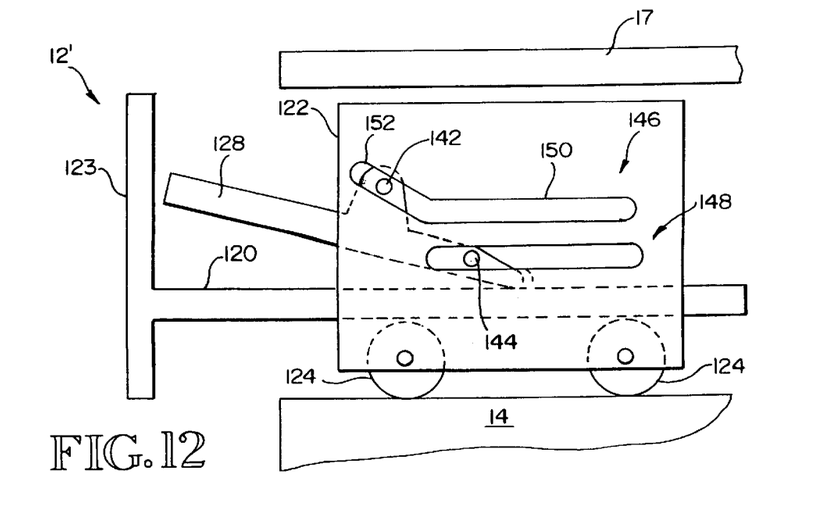
FIG. 12 is a side view of the drawer of FIG. 10 in a partially open position.

Referring to FIGS. 10–12, an alternative drawer 12' embodiment is shown. The drawer 12' includes a panel 120, an intermediate drawer 122 on rollers 124, a tray 126 and a ramp 128. The panel 120 includes an elongated planar portion 121 and a front piece 123. Hinge components are located along the planar portion 121. The panel 120 rests on the rollers 124 adjacent to an inner surface 130 of the intermediate drawer 122. The panel 120 fits between the sidewalls 132, 134 of the intermediate drawer 122. Within each sidewall 132, 134 are a pair of slots 146, 148. The slots 146 are of the same shape and are relatively positioned in the same location on each sidewall 132, 134. Similarly, the slots 148 are of the same shape and are relatively positioned in the same location on each sidewall 132, 134. Each slot 146 includes a straight portion 150 and an angled portion 152. The slots 148 include only a straight portion.

The ramp 128 is coupled to the panel 120 and the intermediate drawer 122. The ramp 128 includes a planar portion 129, a coupling member 131 with movable hooking members 133, and hinge grooves 138. The ramp 128 mounts to the panel 120 with the ramp hinge grooves 138 coupled to the panel hinges 136. The ramp 128 can be moved relative to the panel 120 about an axis 140 of the hinges components 136, 138. The ramp also includes posts 142, 144 at each of two side edges 146, 148. Post 142 of each side edge 146, 148 runs in a slot 146 of a corresponding sidewall 132, 134 of the intermediate drawer 122. Post 144 of each side edge 146, 148 runs in a slot 148 of the corresponding sidewall 132, 134 of the intermediate drawer 122.

The tray 126 is includes an opening 150, one or more underside hooking slots 152, and one or more computer alignment structures 156. The tray 126 is mounted to the ramp 128 by mating the ramp's coupling member 131 into the tray's opening 150 and the ramp's hooking members 133 into the tray's hooking slots 152. The tray 126 is dismounted by pushing on the ramp's coupling member 131. Such action rotates the ramp's hooking members 133 out of alignment with the tray's hooking slots 152 releasing the tray 126.

FIG. 11 shows the drawer 12' in a fully open position without the tray 126. While the drawer 12' is fully open, the ramp 128 is at its greatest angle relative to the panel 120. The ramp's posts 142 are positioned at the end of intermediate drawer slot 146 within portion 152 at a point farthest from slot portion 150. Similarly, the ramp's posts 144 are positioned at the end of intermediate drawer slot 148. As the drawer 12' is closed, the posts 142, 144 travel along the respective slots 146, 148. Post 142 travels along the angled portion 152 of the slot 146 at a downward angle. As a result, the ramp 128 rotates downward as the drawer is closed. FIG. 12 shows the ramp 128 at an intermediate position. Similarly, as the drawer is opened, the posts 142, 144 travel in the opposite direction along slots 146, 148. As the posts 142 travel along the angled portion 152 of the slots 146, the posts 142 move in an upward direction. As a result, the ramp 128 is rotated upward as the drawer 12' opens.

Referring again to FIG. 10, the front panel 123 of the drawer 12' may be wired with an on/off button to turn the computer and expansion module on and off. In addition, a button 174 to send a signal to the computer to commence undocking operations may be included. Such signal causes the computer, for example, to terminate processing and shut down. In addition, status lights 176 may be included for hard drive activity, docking status, power status, ready to proceed with mechanical portion of undocking (open drawer).

Docking Method for the Alternative Embodiment

Prior to docking the computer 110 within the drawer 12', the tray 126 is mounted to the ramp 128. With the tray 126 in place, the computer 110 is placed on the tray 126. The computer alignment members 104 are aligned to the tray alignment members 156. In the embodiment illustrated the computer alignment member 104 is formed as a groove in the computer undersurface 106, while the tray alignment member 156 is formed as a ridge. It is preferable that the alignment members 104, 156 have a mating relation. In alternative embodiments the mating structures may vary. For example, the member 104 may be a protrusion instead of an indentation or groove, while the member 156 is an indentation or groove instead of a protrusion. In addition the members 104, 156 may be single elongated members, multiple elongated members, or one or more corresponding posts, ridges or other protrusions and one or more opening, notches or other indentations.

Figure 13:
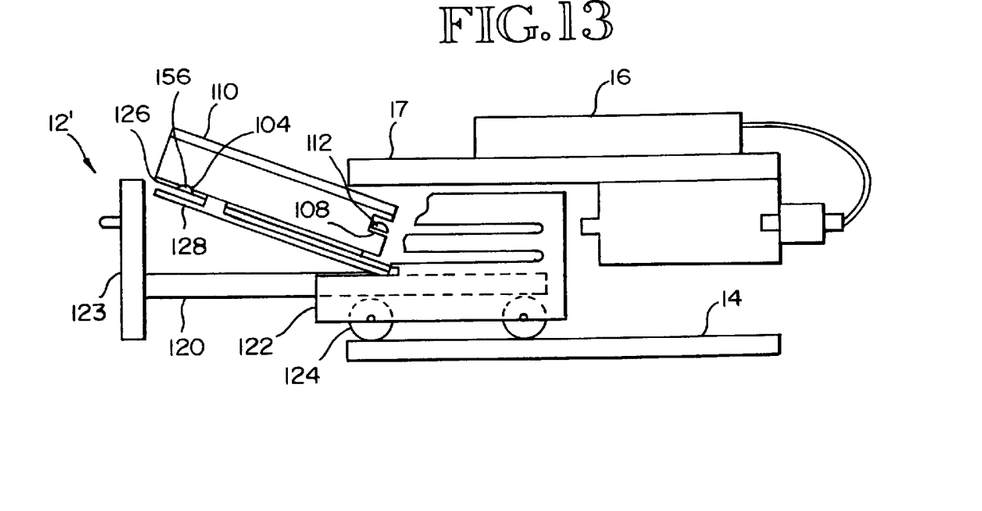
FIG. 13 is a partial cut-away view of the drawer of FIG. 10 and computer of FIG. 9 at an initial step in the docking process.
Figure 14:
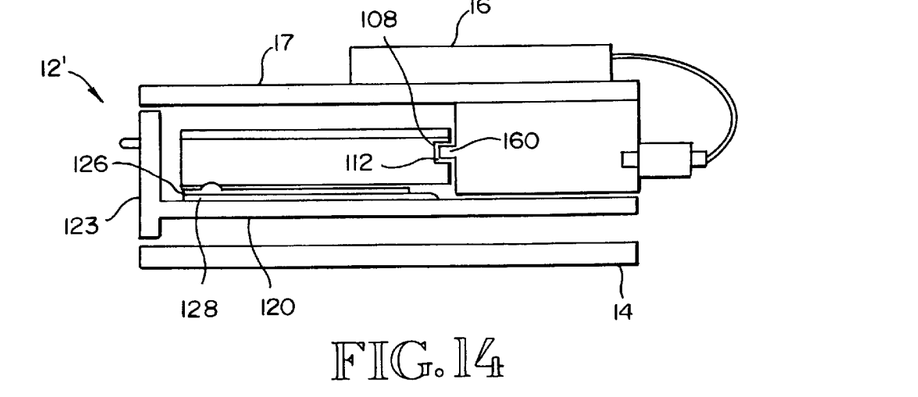
FIG. 14 is a diagrammatic view of the computer docked within the docking drawer of FIG. 13.

When the members 104 and 156 are mating the computer 110 is in a prescribed alignment position ready for docking. The operator then closes the drawer 110 to facilitate docking. As the drawer 12' is closed the ramp 128 moves down. FIG. 13 shows the computer situated on the ramp with portions of the tray 126, ramp 128 and intermediate drawer 122 cut away for purposes of illustration. As the drawer 12' is closed the computer 110 is pushed into a mating relation with a docking connector 160 mounted to the desktop 17. In particular, the computer docking connector 112 mates to the docking connector 160. The docking connector 160 is electrically coupled to the expansion module 16 on the desktop 17. FIG. 14 shows the computer 110 docked within the drawer 12'. The intermediate drawer 122 is not shown merely for purposes of illustration. With the drawer 12' closed the computer 110 is docked. To undock the computer, the drawer 12' is opened disconnecting the docking connectors 112 and 160.

For precise docking control, the panel 120 moves in a prescribed relation to the intermediate drawer 122 and rollers 124. In addition, the tray 126 is designed to position the computer 110 at an precise position which will position the computer docking connector 112 at the mounted docking connector 160 when the drawer 12' is fully closed. For added security, as described for the first embodiment, the drawer 12' may be locked.

Meritorious and Advantageous Effects

One advantage of the invention is that the docking process is easy, convenient and reliable. The operator inserts the computer into the drawer to a desired alignment position, then closes the drawer. Such docking has the ease and reliability of an automated process, but is achieved at substantially less cost. Another advantage is that the computer is unexposed, providing a deterrent to theft. A further deterrent is that the drawer can be locked preventing physical access to the computer. Another advantage of this invention is that additional desktop space is free by having the notebook computer and docking connector be located off the desktop in a drawer.

Although a preferred embodiment of the invention has been illustrated and described, various alternatives, modifications and equivalents may be used. For example although each drawer includes a front piece concealing the computer from view, alternative embodiments of the drawer do not have a front piece leaving the computer exposed to view while docked. In still another embodiment, a front piece may swing out or downward without pulling the drawer open or closed. Although the drawer is shown mounted to a drawer opening in a desk, the opening need not be a drawer opening and may simply be the underside of a desktop having no cabinets or open shelves. Further, although a desk is shown other furnishings such as a cabinet, table, or automobile dashboard may house the drawer. Therefore, the foregoing description should not be taken as limiting the scope of the inventions which are defined by the appended claims.

What is claimed is:

1. A docking apparatus which docks a portable computer, comprising:
   a furnishing having a desktop surface and an opening;
   a drawer for receiving the portable computer, the drawer located away from the desktop surface and sliding within the opening between an open position and a closed position; and
   a docking connector for serving as an electrical interface for interfacing with the portable computer.

2. The apparatus of claim 1, in which the docking connector is stationary and located within the opening.

3. The apparatus of claim 1, in which the docking connector is located within the drawer and moves with the drawer.

4. The apparatus of claim 1, further comprising means for guiding alignment of the computer into a desired alignment position as the computer is inserted within the drawer.

5. The apparatus of claim 1, further comprising a platform located within the drawer and upon which the portable computer rests while docked, wherein the platform moves with the drawer within the opening between the open position and the closed position of the drawer.

6. The apparatus of claim 5, in which the platform includes the docking connector.

7. A docking apparatus for docking a portable computer, comprising:
   a furnishing having a desktop surface and an opening;
   a drawer for receiving the portable computer, the drawer located away from the desktop surface and moving within the opening between an open position and a closed position;
   a docking connector which serves as an electrical interface with the portable computer; and
   means for coupling movement of the drawer to docking and undocking of the computer, wherein the computer is docked by closing the drawer to a prescribed position.

8. A docking apparatus for docking a portable computer, comprising:
   a furnishing having a desktop surface and an opening;
   a drawer for receiving the portable computer, the drawer located away from the desktop surface and moving within the opening between an open position and a closed position;
   a docking connector which serves as an electrical interface with the portable computer;
   a platform located within the drawer and upon which the portable computer rests while docked, in which the platform includes the docking connector; and
   a ramp having a proximal portion and a distal portion, the proximal portion rotatably coupled to the platform, the ramp having a relaxed position in which the distal portion is elevated relative to the platform and a depressed position in which the distal portion is rotated down to the platform upward surface, wherein the docking connector protrudes beyond a height of the ramp relative to the platform while the ramp is in the depressed position and protrudes less than the height of the ramp relative to the platform while the ramp is in the relaxed position, wherein the docking connector is positioned relative to the ramp so as not to contact the portable computer while the ramp is in the relaxed position.

9. The apparatus of claim 8, further comprising a first guide member attached to the ramp and a second guide member attached to the furnishing, wherein the first guide member and second guide member are operative to move the ramp toward the depressed position as the drawer is closed.

10. A docking apparatus and portable computer combination, comprising:
    a furnishing having a desktop surface and an opening;
    a drawer for receiving the portable computer, the drawer located away from the desktop surface and sliding within the opening between an open position and a closed position;
    a first docking connector which serves as an electrical interface with the portable computer; and
    a second docking connector in the portable computer which connects to the first docking connector while the portable computer is docked.

11. The combination of claim 10, further comprising a platform located within the drawer and upon which the portable computer rests while docked, wherein the platform moves with the drawer within the opening between the open position and the closed position of the drawer.

12. The combination of claim 10, further comprising means for guiding alignment of the computer into a desired alignment position as the computer is inserted within the drawer.

13. The combination of claim 11, in which the platform includes the docking connector.

14. A docking apparatus and portable computer combination, comprising:
    a furnishing having a desktop surface and an opening;
    a drawer for receiving the portable computer, the drawer located away from the desktop surface and moving within the opening between an open position and a closed position;
    a first docking connector which serves as an electrical interface with the portable computer;
    a second docking connector in the portable computer which connects to the first docking connector while the portable computer is docked; and
    means for coupling movement of the drawer to docking and undocking of the computer, wherein the computer is docked by closing the drawer to a prescribed position.

15. A docking apparatus and portable computer combination, comprising:
    a furnishing having a desktop surface and an opening;
    a drawer for receiving the portable computer, the drawer located away from the desktop surface and moving within the opening between an open position and a closed position;
    a first docking connector which serves as an electrical interface with the portable computer;
    a second docking connector in the portable computer which connects to the first docking connector while the portable computer is docked;
    a platform located within the drawer and upon which the portable computer rests while docked, in which the platform includes the docking connector; and
    a ramp having a proximal portion and a distal portion, the proximal portion rotatably coupled to the platform, the ramp having a relaxed position in which the distal portion is elevated relative to the platform and a depressed position in which the distal portion is rotated down to the platform upward surface, wherein the docking connector protrudes beyond a height of the ramp relative to the platform while the ramp is in the depressed position and protrudes less than the height of the ramp relative to the platform while the ramp is in the relaxed position, wherein the docking connector is positioned relative to the ramp so as not to contact the portable computer while the ramp is in the relaxed position.

16. The combination of claim 15, further comprising a first guide member attached to the ramp and a second guide member attached to the furnishing, wherein the first guide member and second guide member are operative to move the ramp toward the depressed position as the drawer is closed.

17. A method for docking a portable computer, comprising the steps of:
    inserting a computer into a drawer; and
    manually closing the drawer, wherein the step of manually closing the drawer moves a first docking connector of the portable computer into electrical connection with a second docking connector electrically linked to a computer peripheral device.

18. The method of claim 17, in which the portable computer has an undersurface upon which the portable computer rests and a first opening at the undersurface, the first docking connector located within the first opening, and wherein a platform having an upward surface for receiving the undersurface of the portable computer is situated within the drawer, the second docking connector protruding from the upward surface of the platform, the method further comprising the steps of:
    moving the portable computer into a prescribed alignment position in which the first docking connector is vertically aligned with an engagement position of the second docking connector.

19. The method of claim 18, in which a ramp having a proximal portion and a distal portion is coupled to the platform at the ramp's proximal portion, the ramp having a relaxed position in which the distal portion is elevated relative to the platform and a depressed position in which the distal portion is rotated down to the platform upward surface, wherein the second docking connector protrudes beyond a height of the ramp relative to the platform while the ramp is in the depressed position and protrudes less than the height of the ramp relative to the platform while the ramp is in the relaxed position, wherein the second docking connector is positioned relative to the ramp so as not to contact the portable computer while the ramp is in the relaxed position, wherein the step of moving the portable computer comprises the steps of sliding the portable computer along the platform and onto the ramp.

20. A docking apparatus and portable computer combination, comprising:

a furnishing having a desktop surface and an opening;

a drawer for receiving the portable computer, the drawer located away from the desktop surface and moving within the opening between an open position and a closed position;

a first docking connector which serves as an electrical interface with the portable computer;

a second docking connector in the portable computer;

wherein movement of the drawer from the open position toward the closed position connects the first docking connector and the second docking connector.

* * * * *